Figure 1:
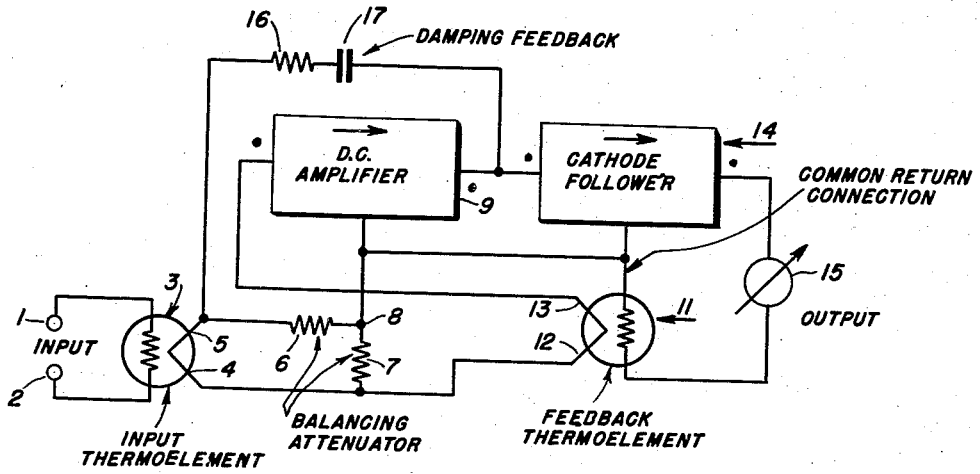

Oct. 21, 1958   R. W. GILBERT ET AL   2,857,569
THERMAL CONVERTER
Filed April 19, 1956

ROSWELL W. GILBERT and
JOHN H. MILLER
INVENTORS

BY
Rudolph J. Jurick
ATTORNEY

United States Patent Office 2,857,569
Patented Oct. 21, 1958

2,857,569

THERMAL CONVERTER

Roswell W. Gilbert, Montclair, and John H. Miller, Short Hills, N. J., assignors, by mesne assignments, to Daystrom, Incorporated, Murray Hill, N. J., a corporation of New Jersey Application April 19, 1956, Serial No. 579,239

4 Claims. (Cl. 324—106)

This invention relates to a thermal converter and more particularly to a thermal converter wherein an alternating current at the converter input results in a direct current output which is directly proportional to the alternating current input.

In the case of a thermoelement, which comprises a resistance element which is used to heat a thermocouple, the heat produced by the resistance element, which is equal to the current squared times the resistance of the element, causes a small voltage to be produced by the thermocouple. The voltage produced is proportional to the temperature, and so to the amount of heat produced by the resistance element. Therefore, the voltage produced is proportional to the root-mean-square (R. M. S.) value of the current squared; the current hereinafter referring to the R. M. S. value thereof. This results in the characteristic square-law function of the thermoelement.

Obviously, the current input to the resistance element may be either an alternating or direct current. The frequency spectrum of the thermoelement, therefore, ranges from direct current to extremely high frequencies. Ordinarily, the thermoelement is used for either alternating current measurements or for A.-C. to D.-C. transfer operations, and when used in either capacity, will have the characteristic square-law response. Occasionally, however, it may be necessary to have a linear response while maintaining the alternating current root-mean-square (R. M. S.), input response as well as the frequency spectrum of a thermoelement. An example of such use is in a converter system for computers for converting from an analog to a digital system wherein it is desired to digitize the R. M. S. level of a A.-C. input. The thermal converter of this invention is basically a thermal system having an overall linear transfer function such that the R. M. S. value of the input to the thermal converter will result in a D.-C. output which is directly proportional to that input.

An object of this invention is the provision of a thermal converter having a first-power transfer function.

An object of this invention is the provision of a thermal converter which converts an alternating current to a direct current wherein the output level is directly proportional to the input level on a linear basis of the R. M. S. value.

An object of this invention is the provision of a thermal converter comprising an input thermoelement operating into a feedback amplifier, which feedback amplifier has a root square feedback transfer function whereby the converter has an overall first-power transfer function.

An object of this invention is the provision of a thermal converter for converting an input signal having an R. M. S. value to a D.-C. output signal having a value which is linearly related to the said R. M. S. value of the input signal, said thermal converter comprising an input thermoelement whereby the input signal into the input thermoelement is converted to a D.-C. signal which is equal to the square of the said R. M. S. value of the input signal; a D.-C. amplifier having an input and output circuit, said D.-C. signal from said input thermoelement being connected to the input circuit of said D.-C. amplifier; a feedback thermoelement; means degeneratively feeding the signal from the D.-C. amplifier output circuit to the D.-C. amplifier input circuit through the said feedback thermoelement whereby the said D.-C. output signal is developed at the D.-C. amplifier output circuit; and means measuring the said D.-C. output signal.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

Figure 2:
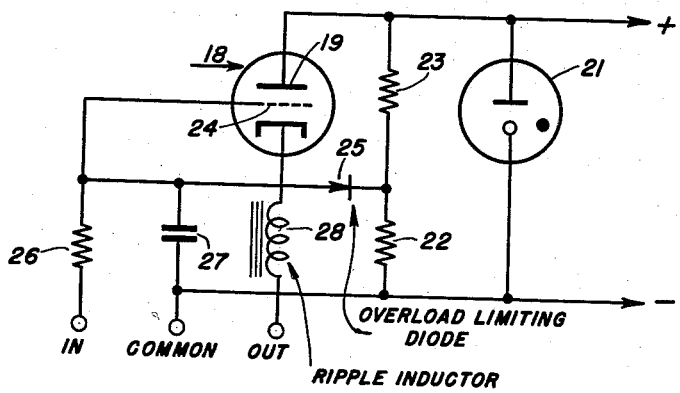

In the drawings wherein like reference characters denote like parts in the several views:

Figure 1 is a block diagram of our improved thermal converter showing the input and feedback thermoelements along with the direct coupled amplifier and cathode follower; and Figure 2 is a schematic diagram of the cathode follower shown in block form in Figure 1.

Referring to Figure 1 of the drawings, the alternating current input signal which is to be converted to a direct current signal of comparable magnitude, is applied to terminals 1 and 2 of the input thermoelement 3. The thermoelement 3 is provided with a thermocouple whereby a D.-C. potential is developed between the terminals 4 and 5. The terminals 4 and 5 are connected to a balancing attenuator comprising resistors 6 and 7 which are provided with a center tap 8. The center tap 8 is connected to the thermal converter system's common return connection.

The voltage which is developed across the resistor 7 is connected to the input of the D.-C. amplifier 9 through the output terminals 12 and 13 of the feedback thermoelement 11. The D.-C. amplifier output is connected to a cathode follower 14. The output from the cathode follower 14 passes through a measuring device 15 and the input element of the feedback thermoelement 11 to the system's common return connection. As mentioned above, the output terminals 12 and 13 of the feedback thermoelement 11 are connected to the D.-C. amplifier input. In this manner the D.-C. amplifier is provided with a feedback having a square-law response.

In addition to the feedback provided by the feedback thermocouple, a damping feedback is utilized in the thermal converter. The damping feedback is in the form of an R-C circuit comprising a series resistor 16 and capacitor 17 which are connected between the D.-C. amplifier output and the terminal 5 in the output of the input thermoelement 3.

The operation of the thermal converter may be understood from an examination of Figure 1. Assume an A.-C. signal is applied to the input terminals 1 and 2 of the input thermoelement 3. The current that is caused to flow will heat the thermoelement to a temperature which is dependent upon the square of the current. The thermocouple then creates a direct-current signal potential which is proportional to the square of the input current. The direct-current signal potential is fed to the voltage divider which comprises the series connected resistors 6 and 7. The signal voltage which appears across the resistor 7 is fed through the output terminals 12 and 13 of the feedback thermocouple 11; to the D.-C. amplifier 9; from the D.-C. amplifier to the cathode follower 14; from the cathode follower to the ammeter 15 and the series input terminals of the feedback thermoelement 11, and thence to the common connection of the thermal converter system. It will be noted that the signal through the feedback thermoelement input circuit is dependent upon the square of the current in the input of the input thermoelement. The feedback thermoelement, in the same manner as the input thermoelement, develops a potential at the output terminals 12 and 13 thereof which is dependent upon the square of the current input to the thermoelement. This feedback thermoelement output potential is connected to the D.-C. amplifier input so as to result in a negative feedback signal to the D.-C. amplifier. The direct current input signal potential combines with the negative feedback signal potential thereby developing a D.-C. error signal difference at the D.-C. amplifier input. The amplified signal from the D.-C. amplifier is applied to the cathode follower 14 and measured by the ammeter 15 in the cathode follower output circuit, or otherwise employed as the useful system output.

A schematic circuit diagram of the cathode follower is shown in Figure 2 of the drawings. Referring to Figure 2, a cathode follower triode tube 18 has an anode 19 which is supplied by a positive voltage source, which voltage source is regulated by means of a gas diode regulator tube 21. A voltage divider comprising resistors 22 and 23 is connected across the voltage regulator tube 21. The grid 24 of the cathode follower triode is connected through a silicon diode 25 to the tap between the resistors 22 and 23. The grid 24 is also connected through a filter capacitor 27 to the common return connection in the thermal converter system, while the output from the D.-C. amplifier 9 is connected through a resistor 26 to the grid 24. A ripple inductor 28 is located in the cathode circuit of the cathode follower.

There are certain considerations in the design of the thermal converter which are relevant to obtaining the proper operation and a high degree of accuracy with the device. An examination of these considerations will be of help in explaining the thermal converter circuitry. One consideration is that if the output current from the cathode follower 14 is measured by a measuring device 15, such as an ordinary D.-C. instrument, which is responsive to the average of the current passing therethrough, the output current must be substantailly ripple-free or an R. M. S./average ratio error will result. If ripple is present in the output current, the error in the output current reading results by reason that the measuring device 15 is responsive to the average of the output current while the feedback thermoelement is responsive to the R. M. S. value of the same output current. Output ripple is reduced by inclusion of an inductor 28 in the cathode circuit of the cathode follower tube 18. Being in the cathode circuit of the cathode follower, the inductor operates by dynamic degeneration through the cathode follower action, rather than simply as an impedance. Output ripple is thereby reduced to a minimum.

The feedback thermoelement is protected against overloads in starting by the use of the silicon diode 25 in the cathode follower circuit. As mentioned above, the diode is connected between the grid 24 of the cathode follower and the voltage tap between the resistors 22 and 23. Through the action of the gas diode regulator tube 21, the voltage at the tap between the resistors remains at a stable reference level. Any time the signal on the grid of the cathode follower tube 18 attempts to swing above this reference level voltage, the diode 25 conducts thereby preventing the grid excursion from exceeding the reference voltage in the positive direction. This prevents excessive current from flowing through the feedback thermoelement which excessive current might burn out the thermoelement. This, then, provides output current limitation which is more definite than is obtainable by, for example, saturation of the cathode follower tube.

In addition to providing a stable reference level past which the grid voltage of the cathode follower may not swing in the positive direction, the gas diode voltage regulator tube 21 isolates the system from transient line voltage fluctuations, which fluctuations would impair the accuracy of the device.

The output from the input thermoelement is, ideally, a direct current which is proportional to the square of the input R. M. S. current. With an input signal of very low frequency, however, there will be thermal ripple present in the thermoelement output voltage. For this reason, in the design of the thermal converter system, a D.-C. amplifier 9 must be used which is average-responsive in order to prevent rectification error from developing. The D.-C. amplifier 9 must operate on a first-power basis in order to prevent erroneous readings due to ripple at low frequencies.

Every thermocouple is inherently slow to react to a change in the input signal. The voltage produced at any thermocouple output is dependent upon the amount of heat to which the thermocouple is subjected, therefore, a thermal delay is inherently present in any thermocouple system. The R-C feedback loop comprising the series resistor 16 and capacitor 17 is included in the thermal converter to damp the feedback phase delay imposed by the feedback thermoelement. The amount of feedback introduced into the system by reason of the feedback thermoelement varies as the square of the output current, whereas the amount of damping feedback is linearly related to the output current level. This means that the amount of damping varies with level. It is thus necessary to select a damping characteristic at a particularly important region of input level, and to accept the damping developed at other levels. It is normally considered satisfactory to critically damp the system for incremental changes at about ⅔ of full scale.

The damping feedback has two parameters, amount and time-constant. The time-constant is determined essentially by the R-C product of the series resistor 16 and capacitor 17, and the amount by the transfer gain of the cathode follower and the resistance of the resistor 6 in the input thermocouple output circuit. Both must be correct for optimum response, as mis-matching will cause galloping or slide-in effects. The effect of mis-matching is similar to that developed by a thermoelement operating into a poorly damped millivoltmeter, wherein the time-constant of the element and the period of the instrument are mis-matched.

In order to obtain an output which is linearly related to the input level, it is necessary that the feedback thermoelement and the input thermoelement track. For this reason thermoelements of similar range and type are used and are preferably selected so as to match within 5 percent of heater current, or approximately 10 percent of the thermocouple output. The higher output thermoelement is then balanced to the lower one by means of the balancing attenuator comprising the series resistor 6 and the shunt resistor 7 in the input thermoelement output circuit. The thermoelements are balanced by passing approximately 10 milliamperes of current through the resistance, or heater, elements in series connection, and adjusting the attenuator shunt resistor 7 to a thermocouple current null. The series resistor 6 is chosen of such a size as to result in the proper amount of damping feedback from the series resistor 16 and capacitor 17, therefore, it is necessary to adjust the shunt resistor 7 when balancing the two thermoelements. With a series resistance 6 of about ten ohms (the amount of resistance necessary for the proper amount of damping generally) the minimum attenuator resistance based upon a maximum initial mis-match of 5 percent in thermoelement input current, will be 100 ohms, which is not an appreciable burden upon the atenuated thermocouple. The input thermoelement 3 rather than the output thermoelement 11 is attenuated so that the attenuator will cause the system to come to zero if the input thermoelement is blown; otherwise the feedback loop would open and the system would become random.

To avoid difficulties with ground return strays the thermoelements are preferably insulated couple types. Also, thermoelements having a sensitivity of 10 milliamperes for 5 millivolts output are selected as having an optimum stability. The basic input and output range of the thermal converter is therefore 10 milliamperes, and other current input ranges are obtained by inclusion of a current transformer when required. Voltage ranges are obtained by adding input resistance at 100 ohms/volt.

Assuming a D.-C. amplifier 9 having a basic resolution of 5 microvolts, then, the resolution ratio of the thermal converter is about 1000 at the full-scale thermoelement potential of 5 millivolts. However, the square-law transfer function of the thermoelements causes the resolution ratio to fall off with decreasing input level, and finally the feedback ratio falls to zero at zero input level. Thus the thermal converter is accurate and useful only over the upper 70 and 80 percent of the input range, and it has no definite zero. But over the useful portion of the input range the resolution is sufficient to make the stability of the thermoelements the determinant of performance. This is approximately ½ percent as a permanent accuracy tolerance.

Likewise, the damping can only be made optimum over a restricted range. But by making the damping critical at about 70 percent of full scale, the over-shoot at full scale will not be excessive, and the over-damping at about 30 percent of full scale will not cause excessive delay. The design concession is similar to that necessary in non-linear cut pole piece indicating instruments, and in fact is equivalent to an instrument with an inverse square-law pole cut as sometimes used in thermal instruments. The response speed at the critically-damped level is approximately that of one of the thermoelements proper, and is somewhat faster than the usual thermal instrument wherein the mechanism is overdamped.

Having now described our invention in detail in accordance with the requirements of the patent statutes what we desire to protect by Letters Patent of The United States is set forth in the following claims.

We claim:

1. A thermal converter for porducing a D.-C. output current that varies linearly in proportion to the R. M. S. value of an input current, comprising a first thermoelement having an input circuit and an output circuit and characterized by a square law transfer function relating output potential to the square of input current; a second thermoelement having an input circuit and an output circuit and having a transfer function similar to the first thermoelement; a D.-C. amplifier having input and output circuits; circuit elements connecting the output circuits of the two thermoelements to apply their difference in output potential to the amplifier input circuit; circuit elements connecting the amplifier output circuit to the input circuit of the said second thermoelement; and a D.-C. current-responsive device included in the output circuit of the amplifier and the input circuit of the second thermoelement.

2. The invention as recited in claim 1, wherein the last stage of the amplifier is a cathode follower, and including an R-C damping circuit connected between the amplifier output and input circuits.

3. The invention as recited in claim 1, wherein each thermoelement comprises a thermocouple constituting the output circuit and a heater element thermally coupled to the thermocouple and constituting the input circuit.

4. The invention as recited in claim 3, wherein the last stage of the amplifier is a cathode follower, and including an R-C damping circuit connected between the amplifier output and input circuits.

References Cited in the file of this patent

UNITED STATES PATENTS

| | | |
|---|---|---|
| 2,373,241 | Field | Apr. 10, 1945 |
| 2,434,929 | Holland et al. | Jan. 27, 1948 |
| 2,511,855 | Keck et al. | June 20, 1950 |
| 2,535,257 | Berger | Dec. 26, 1950 |
| 2,565,922 | Howard | Aug. 28, 1951 |
| 2,702,857 | Berger et al. | Feb. 22, 1955 |
| 2,744,168 | Gilbert | May 1, 1956 |
| 2,762,975 | Bregar | Sept. 11, 1956 |

OTHER REFERENCES

Article by I. G. Baxter published in Electronic Engineering, vol. 26, No. 313, pages 97–105, Mar. 1954. (Copy available in 250–27N.)